US007081146B2

(12) United States Patent
Hällgren et al.

(10) Patent No.: US 7,081,146 B2
(45) Date of Patent: Jul. 25, 2006

(54) APPARATUS FOR SIMULTANEOUS CLEANING OF A LIQUID AND A GAS

(75) Inventors: Ingvar Hällgren, Tumba (SE); Leif Larsson, Tumba (SE); Rolf Ljungtström, Vagnhärad (SE)

(73) Assignee: Alfa Laval Corporate AB, Lund (SE)

( * ) Notice: Subject to any disclaimer, the term of this patent is extended or adjusted under 35 U.S.C. 154(b) by 176 days.

(21) Appl. No.: 10/492,736

(22) PCT Filed: Oct. 30, 2002

(86) PCT No.: PCT/SE02/01971

§ 371 (c)(1),
(2), (4) Date: Jul. 14, 2004

(87) PCT Pub. No.: WO03/037521

PCT Pub. Date: May 8, 2003

(65) Prior Publication Data

US 2004/0237792 A1      Dec. 2, 2004

(30) Foreign Application Priority Data

Nov. 1, 2001     (SE)     .................. 0103631-8

(51) Int. Cl.
B04B 5/12       (2006.01)
F01M 13/04     (2006.01)
B01D 45/12     (2006.01)

(52) U.S. Cl. ............................ 55/401; 55/406; 55/421; 55/DIG. 19; 210/512.1

(58) Field of Classification Search .................. 55/400, 55/401, 403, 406, 421, DIG. 19; 95/270; 210/168, 512.1; 123/198 E; 494/56, 70
See application file for complete search history.

(56) References Cited

U.S. PATENT DOCUMENTS

| 4,478,718 | A | * | 10/1984 | Saget ....................... 210/512.3 |
| 4,723,346 | A | | 2/1988 | Tachibana et al. |
| 4,840,645 | A | * | 6/1989 | Woodworth et al. .......... 95/270 |
| 5,082,030 | A | | 1/1992 | Bucher |
| 5,092,912 | A | * | 3/1992 | Korman ....................... 95/197 |
| 5,637,217 | A | * | 6/1997 | Herman et al. .......... 210/380.1 |
| 6,536,211 | B1 | * | 3/2003 | Borgstrom et al. ........... 60/311 |
| 6,821,319 | B1 | * | 11/2004 | Moberg et al. ............... 95/270 |
| 2004/0107681 | A1 | * | 6/2004 | Carlsson et al. .............. 55/406 |
| 2005/0198932 | A1 | * | 9/2005 | Franzen et al. ............... 55/406 |

FOREIGN PATENT DOCUMENTS

| DE | 28 47 520 A1 | 5/1980 |
| DE | 43 11 906 A1 | 10/1994 |
| DE | 199 14 166 A1 | 10/2000 |
| EP | 455 674 | 7/1968 |
| EP | 0 122 795 | 10/1984 |
| EP | 0 541 268 B1 | 8/1996 |
| EP | 1 217 183 A1 | 6/2002 |
| JP | 2000-279851 | 10/2000 |
| WO | WO 00/00687 | 1/2000 |
| WO | WO 02/088445 A2 | 11/2002 |

* cited by examiner

Primary Examiner—Frank M. Lawrence
(74) Attorney, Agent, or Firm—Michaud-Duffy Group LLP

(57) ABSTRACT

An apparatus for simultaneous cleaning of a liquid and a gas includes a centrifugal rotor delimiting in a casing a separation chamber that is arranged for through flow and cleaning of the liquid. On the outside of the casing separation discs are mounted for rotation with the centrifugal rotor. Between the separation discs there are formed axially extending separation passages formed for through flow and cleaning of the gas.

14 Claims, 3 Drawing Sheets

APPARATUS FOR SIMULTANEOUS CLEANING OF A LIQUID AND A GAS

CROSS-REFERENCE TO RELATED APPLICATIONS

This application is entitled to the benefit of and incorporates by reference essential subject matter disclosed in International Patent Application No. PCT/SE02/01971 filed on Oct. 30, 2002 and Swedish Patent Application No. 0103631-8 filed on Nov. 1, 2001.

FIELD OF THE INVENTION

The present invention relates to an apparatus for simultaneous cleaning of a liquid from first particles suspended therein and cleaning of a gas from second particles suspended therein. The apparatus includes a centrifugal rotor that is rotatable about a rotational axis and that delimits a separation chamber arranged for through flow and cleaning of said liquid, a driving device for rotation of the centrifugal rotor about said rotational axis and a gas cleaning device that is connected with the centrifugal rotor for rotation together therewith and that is arranged for through flow and cleaning of said gas.

BACKGROUND OF THE INVENTION

A previously known apparatus of this kind is shown and described in WO 99/56883. In this case the centrifugal rotor supports a gas cleaning device that includes both a number of conical separation discs rotatable with the centrifugal rotor and a number of stationary conical separations discs. The stationary separation discs are arranged between the rotatable separation discs. The gas cleaning device has a gas inlet for the gas to be cleaned formed in a rotatable housing, that supports the rotatable separation discs on its inside, and a gas outlet for cleaned gas formed as a stationary central tub, which on its outside supports the stationary separation discs. An apparatus designed in this way is relatively expensive to manufacture. Particularly the conical separation discs are expensive.

Another known apparatus of the defined kind is shown and described in the Japanese patent application no. 11087568 (Publication Number 20002 79851 A). In this case a centrifugal rotor delimits a relatively large, peripherally arranged separation chamber for cleaning of liquid and a relatively small, centrally arranged separation chamber for cleaning of gas. An apparatus designed in this way has a relatively poor gas cleaning efficiency. The available separation space in the centrifugal rotor for gas to be cleaned is relatively small and is, in addition thereto, situated relatively dose to the rotational axis of the centrifugal rotor.

A further known apparatus intended for simultaneous cleaning of a liquid and a gas is shown and described in DE 43 11 906 A1. In this case the centrifugal rotor is completely without special members for the gas cleaning. The gas to be cleaned is to be brought into rotation by the centrifugal rotor by being introduced into a narrow gap between the centrifugal rotor and a stationary housing surrounding the latter. Even an apparatus designed in this way has a relatively poor gas cleaning efficiency.

The object of the present invention is to provide an apparatus for accomplishing continuous cleaning of both a liquid and a gas, said apparatus having a good gas cleaning efficiency and being relatively inexpensive to manufacture.

SUMMARY OF THE INVENTION

These objects may be obtained by an apparatus of the initially defined kind, which is characterized in that the gas cleaning device includes several separation discs distributed about said rotational axis, that the separation discs are arranged radially and/or axially outside said separation chamber and that each of the separation discs extends axially in relation to the rotational axis, so that the separation discs form between themselves axially extending separation passages for through flow of said gas.

Separation discs of this kind may be produced relatively inexpensively and be formed so that they effectively clean a gas caused to flow through the passages between themselves. Furthermore, a gas cleaning device having separation discs of this kind may be made relatively compact. By axially extending separation passages is meant in this connection that the separation passages shall conduct the gas to be cleaned either completely in parallel with the rotational axis of the centrifugal rotor or somewhat obliquely in relation there to.

For obtainment of an efficient cleaning of the gas it is advantageous if the separation discs extend in a direction from said rotational axis in a way such that each one of the separation passages between the discs crosses at least one imaginary radius starting from the rotational axis. If desired, the separation discs may be made completely planar but preferably they are formed so that they extend arcuately from the rotational axis.

If desired, said separation discs may by arranged in a gas separation chamber having a surrounding wall that constitutes part of the rotor. Such a gas separation chamber is situated radially and/or axially outside the previously mentioned liquid separation chamber, which is delimited by a casing of the rotor and is arranged for through flow and cleaning of said liquid. Preferably, however, the separation discs are arranged in a way such that the separation passages between the separation discs are open radially outwardly, seen from the rotational axis of the rotor. Thereby, particles separated from the gas may easily be thrown away from the rotor, which is thereby automatically kept dean from such particles.

One advantage of having the separation discs arranged radially outside the liquid separation chamber of the rotor is that they will operate at a relatively large distance from the rotational axis of the rotor and, thereby, provide a relatively good separation efficiency. On the other hand, an arrangement of this kind requires relatively much energy for the rotor rotation. If the separation discs are arranged axially on one side of the liquid separation chamber, they can be given a relatively large radial extension and a correspondingly relatively small axial extension.

Advantageously the centrifugal rotor is arranged in a stationary housing, which delimits a through flow channel for the gas to be cleaned. If the separation discs are arranged radially outside the liquid separation chamber, the main part of the through flow channel preferably is formed by radially outwardly open separation passages between the separation discs. If instead the separation discs are arranged axially on one side of the liquid separation chamber, the through flow channel may form a supply channel to the separation passages, which extends around the whole of the rotor.

For certain separation cases it may be suitable to form the separation passages in a way such that their inlets for gas to be cleaned are situated at a radial level closer to the rotor rotational axis than that at which the outlets of the passages ewe situated. Thereby, due to the rotation of the rotor, the separation discs will create a pumping effect on the gas flowing through the separation passages. This means that the gas to be cleaned will be sucked into the cleaning device and, therefore, will not have to be supplied thereto at an over pressure.

The centrifugal rotor at the cleaning device according to the invention—may be driven by any suitable means. Thus, it may be driven by means of an electrical, hydraulical or pneumatical motor. Advantageously, it may be driven by means of a turbine of one kind or another. According to a preferred embodiment of the invention the centrifugal rotor is arranged to be driven by means of an overpressure of a liquid supplied thereto, such liquid being caused to leave the centrifugal rotor through one or more nozzles situated at a distance from the rotational axis of the rotor and directed in the circumferential direction of the rotor. The centrifugal rotor in this case is driven by the reaction forces from the liquid, e.g. cleaned liquid, leaving the rotor through said nozzles.

BRIEF DESCRIPTION OF THE DRAWINGS

The invention is described in the following with reference to the accompanying drawings, in which.

DETAILED DESCRIPTION OF THE PREFERRED EMBODIMENTS

Figure 1:
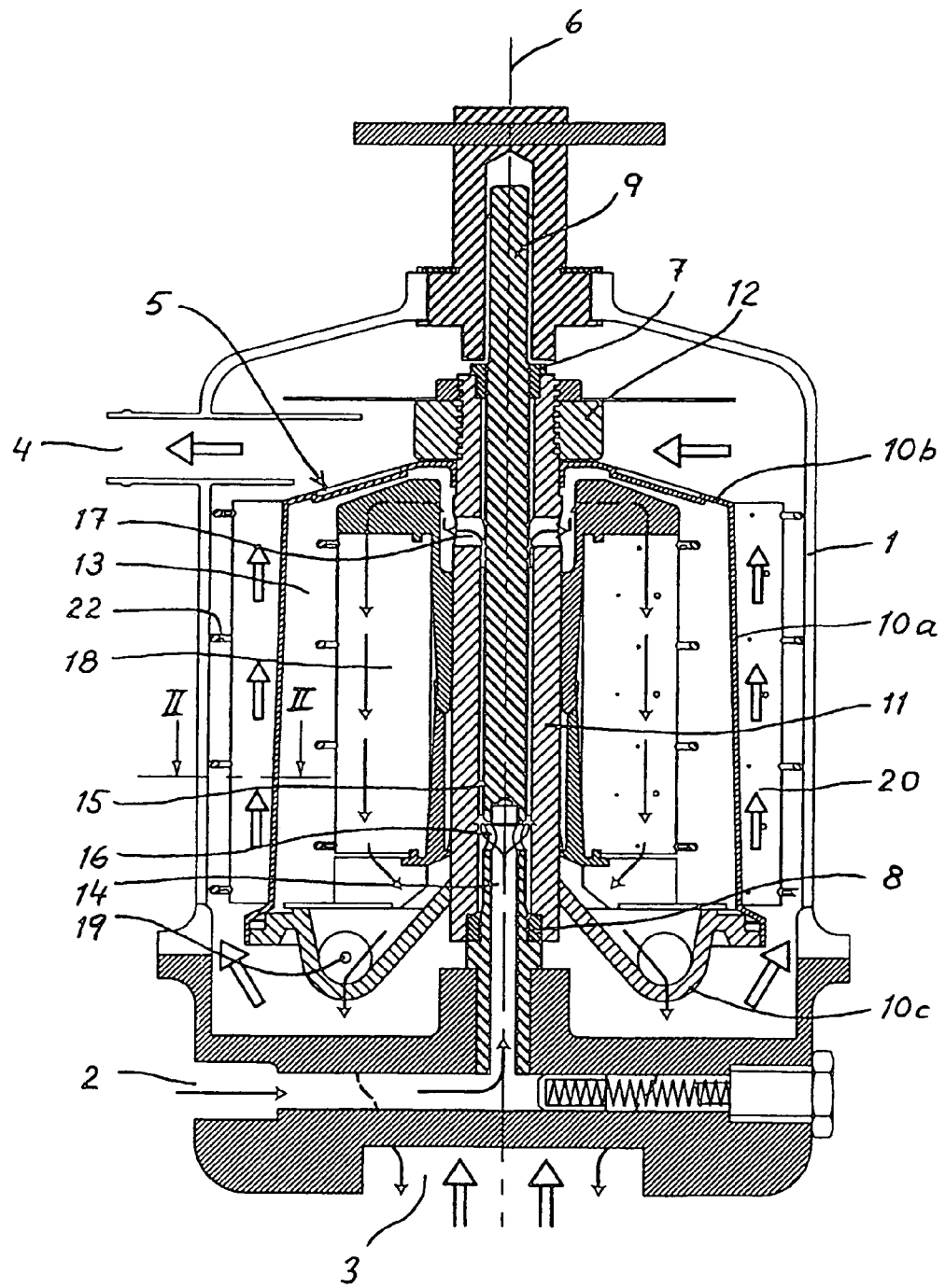
FIG. 1 shows a first embodiment of the invention.
Figure 2:
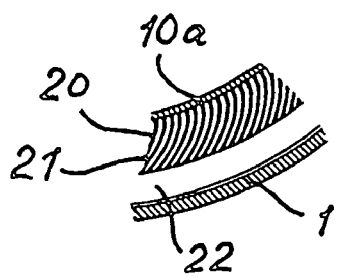
FIG. 2 shows a section along the line II—II in FIG. 1.

The FIGS. 1 and 2 show a first embodiment of an apparatus for simultaneous cleaning of a liquid and a gas. The apparatus includes a stationary housing 1, which has an inlet 2 for liquid to be cleaned and an inlet 3 for gas to be cleaned. The liquid can be constituted by lubricating oil circulating through an internal combustion engine during its operation, and the gas can be constituted by crankcase gas coming from the same combustion engine. The lubricating oil includes among other things soot particles to be separated, and the crankcase gas includes a mixture of soot particles and oil particles to be separated. The housing 1 has a separate outlet 4 for cleaned gas, whereas said inlet 3 for gas to be cleaned also serves as an outlet for cleaned liquid.

Within the housing 1 a centrifugal rotor 5 is arranged to rotate around a vertical centre axis 6. The rotor 5 is supported in two bearings 7 and 8 by a central stationary column 9, that is fixed at its lower part and at its upper part relative to the housing 1.

The rotor 5 includes a casing consisting of a surrounding wall 10a, an upper end wall 10b and a lower end wall 10c. Furthermore, the rotor 5 includes a tubular member 11 extending centrally through the casing 10a–c and supporting the same. A locking ring 12 is threaded on to the upper most part of the member 11 and keeps the casing fixed relative to the member 11. Within the rotor a separation chamber 13 for cleaning of said liquid is delimited. For passage of the liquid into the separation chamber 13 the liquid inlet 2 of the housing 1 communicates with a central channel 14 in a lower tubular part of the stationary column 9. The column 9, the outer diameter of which is somewhat smaller than the inner diameter of the rotatable tubular member 11, forms between itself and the member 11 an inlet channel 15 annular in cross section. This inlet channel 15 communicates at its lower part through openings 16 in the column with the central channel 14 thereof and at its upper part with the separation chamber 13 through openings 17 in the tubular member 11.

Within the separation chamber 13 the tubular member 11 supports on its outside a package of separation discs 18 distributed about the centre axis 6. Each disc extends both axially and from a first radial level to a second radial level in the rotor, situated at different distances from the centre axis 6 of the rotor. The discs 18 form an angle with radii drawn from the central axis 6 of the rotor. Between the discs 18 there are formed axially extending separation passages for through flow of liquid in the way illustrated by means of arrows in the separation chamber 13.

At its lower part the rotor 5 has two outlet openings 19 (only one of these can be seen from FIG. 1), which are spaced from the rotor centre axis 6 and are directed substantially tangentially in relation to a circle line drawn therethrough and coaxially with the centre axis 6.

For a more detailed description of the separation discs 18 and their arrangement in the rotor reference is made to WO 99/51353. Any other different kind of separation means than the separation discs shown here may be used in the rotor in according to the invention. Thus, the invention is not limited to any particular separation means within the rotor for cleaning of said liquid. Separation discs of another kind that can be used are conventional conical separation discs stacked upon each other in the separation chamber concentrically with the centre axis of the rotor.

On its outside the surrounding wall 10a of the rotor casing carries further separation discs 20 evenly distributed about the centre axis of the rotor. The separation discs 20 extend axially as well as from the casing a distance towards said stationary housing 1. As can be seen from FIG. 2 the discs 20 extend obliquely in relation to radii drawn from the centre axis of the rotor towards the housing 1. Between the discs 20 there are formed separation passages 21 (see FIG. 2), which like the discs 20 extend substantially across the whole axial length of the rotor. Several annular members 22 extend about the whole of the rotor 5 at different axial levels and keep the discs in place relative to each other and relative to the rotor. These bands fill almost but not completely the space between the discs 20 and the inside of the stationary housing 1, so that gas to be cleaned is forced to flow mainly through said separation passages 21 and not radially outside the discs 20. The discs 18 within the rotor may be formed in the same way as the discs 20.

The apparatus according to FIGS. 1 and 2 operates in following manner.

Liquid to be cleaned is supplied at an overpressure through the inlet 2 in the housing 1 and is conducted further on through the channel 14 and the openings 16 and 17 into the upper part of the separation chamber 13. Within the separation chamber 13 the liquid is conducted downwardly between the separation discs 18 towards and out through the rotor outlets 19. At its outflow through these outlets 19 the liquid generates a reaction force causing and keeping the rotor in rotation about the centre axis 6. Through the action of the centrifugal force the liquid while flowing between the separation discs 18 is freed from particles suspended in the liquid and having a larger density than that. The particles first deposit on the separation discs and then slide to the radially outermost edges thereof, from where they are moved by centrifugal force further radially outwardly until they reach and deposit on the inside of the rotor casing. The liquid freed from particles leaves the rotor through the outlet openings 19 and flows further out of the housing 1 through a bottom outlet formed by the inlet 3 of the housing 1 for gas to be cleaned.

The gas to be cleaned enters, as already mentioned, through the gas inlet 3 of the housing 1 and is conducted upwardly and axially through the passages 21 between the separation discs 20 on the outside of the rotor casing 5. As a consequence of the rotation of the rotor 5 particles suspended in and having a larger density than the gas are separated from the gas in these passages. The particles first deposit on the separation discs 20 and thereafter slide thereon to their radially outermost edges. From here they are thrown away from the rotor and hit the inside of the stationary housing 1. By gravity the separated particles move downwardly to the lower part of the interior of the housing 1. Since the embodiment of the apparatus according to the invention shown here is intended for freeing crankcase gas from among other things oil mist, it is presumed that the particles thus separated from the gas will coalesce and that the formed liquid will run out of the housing 1 through its bottom outlet 3. If the particles to be separated from the gas are dry, the bottom part of the housing 1 is preferably made conical and tapering downwardly towards the bottom outlet 3.

The cleaned gas flows upwardly in the housing 1 and leaves it through the gas outlet 4.

If the liquid being cleaned is constituted by lubricating oil circulating in a combustion engine, and the gas being cleaned comes from the crankcase of the same combustion engine, both the lubricating oil cleaned in the rotor and the lubricating oil separated from the crankcase gas may be re-conducted from the housing 1 through the gas inlet/liquid outlet 3 to said crankcase.

Figure 5:
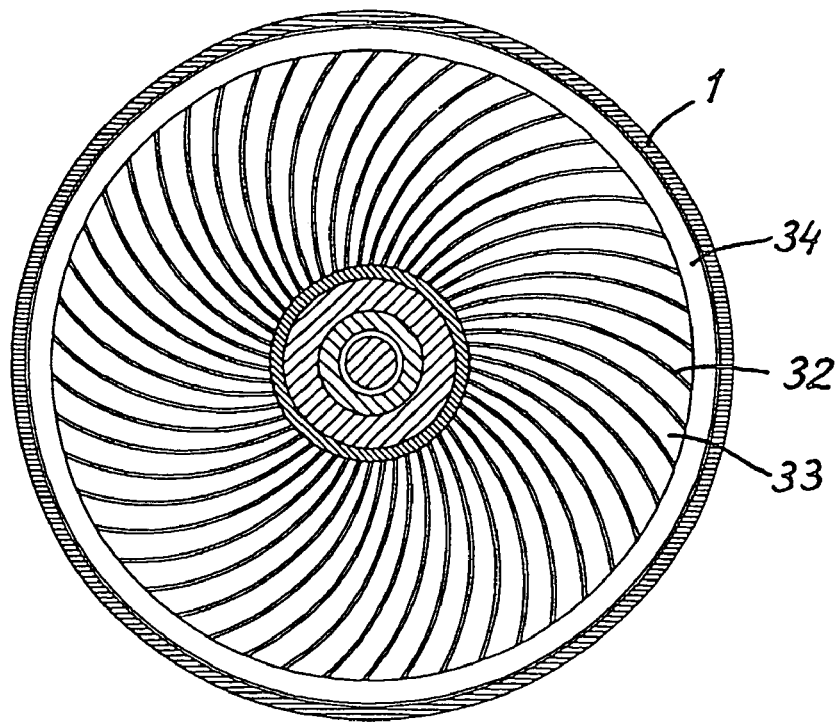
FIG. 3 shows a second embodiment of the invention and
  FIGS. 4 and 5 show sections along the lines IV—IV and V—V, respectively, in FIG. 3.
Figure 4:
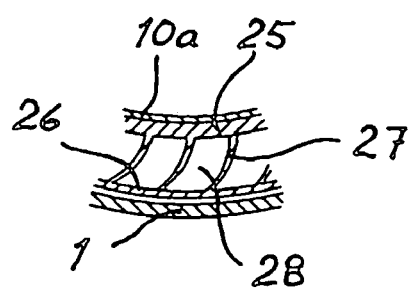
Figure 3:
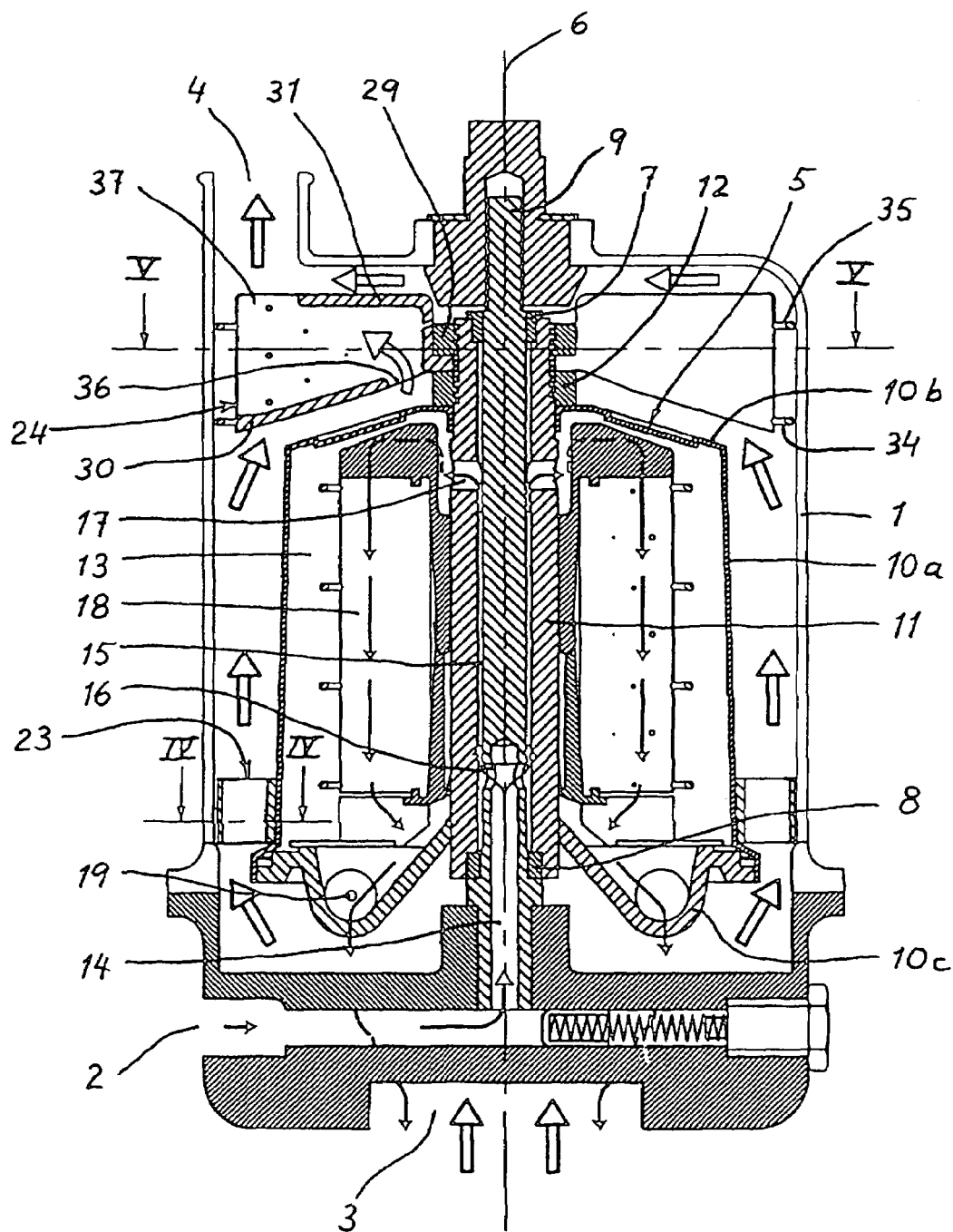

The FIGS. 3–5 show a second embodiment of an apparatus for simultaneous cleaning of a liquid and a gas. This embodiment is substantially the same as the first embodiment with regard to the parts of the latter carrying the reference numerals 1–19. The same reference numerals have been used in the second embodiment for corresponding details.

The differences between the two embodiments are to be found in parts which are intended for the gas cleaning. Thus, the embodiment in the FIGS. 3–5 has a first cleaning device 23 placed on the outside of the surrounding wall 10*a* of the rotor casing and a second cleaning device 24 placed on top of the upper end wall 10*b* of the rotor casing.

The cleanings device 23 covering only a limited lower part of the surrounding wall 10*a* is shown more in detail in FIG. 4. It includes an inner annular sleeve 25, that abuts against the surrounding wall 10*a*, and an outer annular sleeve 26 having a larger diameter than the sleeve 25. A lot of adulate wings or blades 27 extending between the sleeves 25 and 26 are evenly distributed about the centre axis 6 of the rotor and delimit between themselves passages 28 extending substantially axially. The sleeves 25, 26 and the wings 27 are preferably formed in one piece.

By means of on, the friction forces or by means of glue or in some other way the cleaning device 23 is fastened to the surrounding wall 10*a* for rotation together with the rotor 5 in the housing 1. A small interspace is present between the cleaning device 23 and the housing 1.

The cleaning device 24, that is kept fixed to the central tubular member 11 of the rotor by means of a locking ring 29, includes a lower wall 30 and an upper wall 31, both extending about the centre axis 6 of the rotor axially spaced from each other. A large number of separation discs 32 are arranged between the walls 30 and 31. These discs extend both axially from the one wall 30 to the other wall 31 and arcuately from said locking ring 29 and outwardly towards the surrounding wall of the stationary housing 1. The discs 32 are evenly distributed about the centre axis 6 of the rotor and form between themselves passages 33 intended for through flow of gas to be cleaned. Two annular members 34 and 35 extend about the discs 32 and almost fills out a space between the discs 32 and the surrounding stationary housing 1. A certain play is left between the members 34, 35 and the housing 1.

As can be seen from FIG. 3, the walls 30 and 31 are formed in a way such that they leave between their respective radially inner portions an annular opening 36. In a corresponding way an annular opening 37 is formed between the radially outermost portion of the upper wall 31 and the upper annular member 35. The opening 37 is situated at a larger distance from the centre axis 6 of the rotor than is the opening 36. By this configuration of the walls 30 and 31, the discs 32 and the annular members 34 and 35, the gas to be cleaned is forced to flow through the passages 33 from the opening 36 to the opening 37, whereas gas flow radially outside the cleaning device 24 is substantially prevented.

The apparatus according to FIGS. 3–5 operates with respect to the cleaning of liquid exactly in the same way as the apparatus according to the FIGS. 1 and 2. With respect to the cleaning of gas the apparatus according to the FIGS. 3–5 operates in the following manner.

Gas to be cleaned enters through the gas inlet 3 of the housing 1 and is conducted upwardly through the passages 28 in the cleaning device 23. By the wings 27 the gas is brought into rotation together with the rotor 5 so that centrifugal force will act on the gas and particles suspended therein. The gas flows further under rotation upwardly in the interspace between the rotor 5 and the stationary housing 1. In the passages 28 as well as in the interspace between the rotor 5 and the housing 1 some particles are separated from the through flowing gas as a consequence of the centrifugal force. Such particles deposit on the inside of the housing 1 and move gradually downwardly by gravity. The gas flows further upwardly and through the passages 33 in the upper cleaning device 24.

The cleaning device 24 is substantially more efficient than the cleaning device 23, the latter operating only as a pre-separator for separating relatively large particles from the gas. While the gas is flowing through the passages 33 in the cleaning device 24 it is freed from remaining particles. These first deposit on the arcuate separation discs 32 and then slide thereon radially outwardly to the radially outermost edges of the discs. From there the particles are thrown away from the discs 32 and deposit on the stationary housing 1 between the two aforementioned annular members 34, 35. On the inside of the housing 1 the particles move downwardly past the whole of the rotor 5 and afterwards pass out through the bottom outlet 3.

Since the cleaning device 24 has its as outlet 37 situated at a larger radius than its gas inlet 36, the separation discs 32 upon rotation of the rotor 5 will act as a fan or pump. Hereby, gas to be cleaned will be sucked in through the gas inlet 3 and further upwardly to and into the cleaning device 24, and at a certain raised pressure, will be pressed out of the housing 1 through the gas outlet 4. The gas to be cleaned, therefore, need not be supplied to the cleaning device at an over pressure. The just described suction elect of the separator discs can be increased somewhat if an annular stationary partition, suitably supported by the housing 1, extends from the surrounding wall of the housing inwardly towards the rotational axis 6 of the rotor to the gas inlet 36 in the interspace between the wall 30 and the upper end wall 10*b* of the rotor casing.

What is claimed is:

1. An apparatus for simultaneous cleaning of a liquid from first particles suspended therein and cleaning of a gas from second particles suspended therein, including
a centrifugal rotor, that is rotatable about a rotational axis and that delimits a separation chamber arranged for through flow and cleaning of said liquid,
a driving device for rotation of the centrifugal rotor about said rotational axis and
a gas cleaning device, that is connected with the centrifugal rotor for rotation together therewith and that is arranged for through flow and cleaning of said gas, wherein the gas cleaning device includes several separation discs distributed about said rotational axis,
the separation discs are placed in at least one of a radial and axial orientation outside said separation chamber and
each of the separation discs extends axially in relation to the rotational axis, so that the separation discs form between themselves axially extending separation passages for through flow of said gas.

2. An apparatus according to claim 1, wherein at least a part of the separation passages are open radially outwardly, seen from the rotational axis of the centrifugal rotor.

3. An apparatus according to claim 1, wherein the separation discs extend in a direction from said rotational axis in a way such that each of the separation passages cross at least one imaginary radius starting from the rotational axis.

4. An apparatus according to claim 3, wherein the separation discs extend arcuately in a direction from the rotational axis.

5. An apparatus according to claim 1, wherein the centrifugal rotor has a casing, which delimits said separation chamber for cleaning of liquid and which on its outside supports the separation discs.

6. An apparatus according to claim 1, wherein the centrifugal rotor is arranged in a stationary housing and a through flow channel for said gas to be cleaned is delimited between the centrifugal rotor and the stationary housing.

7. An apparatus according to claim 6, wherein at least a part of said through flow channel is formed by said separation passages.

8. An apparatus according to claim 6, wherein at least a part of said through flow channel forms a supply channel for conducting the gas to be cleaned to at least some of said separation passages.

9. An apparatus according to claim 8, wherein the separation passages have inlets and outlets, the inlets being situated closer to the rotational axis of the centrifugal rotor than the outlets.

10. An apparatus according to claim 1, wherein the driving device for rotation of the centrifugal rotor includes a pressure fluid source and a turbine device arranged for rotation of the centrifugal rotor by means of pressure fluid from the pressure fluid source.

11. An apparatus according to claim 10, wherein the centrifugal rotor is arranged for receiving said pressure fluid and is provided with at least one outlet opening for releasing said pressure fluid at a distance from said rotational axis in a way such that the centrifugal rotor is subjected to a rotational force.

12. An apparatus according to claim 11, wherein the pressure fluid source is a source of pressurized liquid.

13. An apparatus according to claim 12, wherein the liquid in said pressure fluid source is constituted by liquid to be cleaned in the centrifugal rotor.

14. An apparatus according to claim 13, which for receiving said liquid to be cleaned communicates with a space, that contains lubricating oil coming from an internal combustion engine, and for receiving said gas to be cleaned communicates with a space that contains crankcase gas coming from said combustion engine.

* * * * *